United States Patent
Koskinen et al.

(10) Patent No.: US 10,385,513 B2
(45) Date of Patent: Aug. 20, 2019

(54) METHOD AND A SYSTEM FOR QUALITY OPTIMIZATION OF GREEN LIQUOR

(71) Applicant: VALMET AUTOMATION OY, Espoo (FI)

(72) Inventors: Jukka A. Koskinen, Tampere (FI); Mikko Leskinen, Nokia (FI); Jarmo Mansikkasalo, Pirkkala (FI)

(73) Assignee: VALMET AUTOMATION OY, Espoo (FI)

( * ) Notice: Subject to any disclaimer, the term of this patent is extended or adjusted under 35 U.S.C. 154(b) by 75 days.

(21) Appl. No.: 15/707,676

(22) Filed: Sep. 18, 2017

(65) Prior Publication Data

US 2018/0080173 A1    Mar. 22, 2018

(30) Foreign Application Priority Data

Sep. 16, 2016 (FI) ........................................ 20165695

(51) Int. Cl.
*D21H 17/66* (2006.01)
*C01B 17/22* (2006.01)
(Continued)

(52) U.S. Cl.
CPC ............ *D21H 17/66* (2013.01); *C01B 17/22* (2013.01); *C01D 1/04* (2013.01); *C01D 5/00* (2013.01);
(Continued)

(58) Field of Classification Search
None
See application file for complete search history.

(56) References Cited

U.S. PATENT DOCUMENTS

| 4,536,253 A | 8/1985 | Bertelsen |
|---|---|---|
| 5,616,214 A | 4/1997 | Leclerc |

(Continued)

FOREIGN PATENT DOCUMENTS

| EP | 0 524 743 B1 | 12/1995 |
|---|---|---|
| FI | 114813 B | 12/2004 |

(Continued)

OTHER PUBLICATIONS

Salmenoja et al. "Solving Deposit Problems in the Smelt Dissolving Tank", Tappi Engineering Conference, pp. 793-797, 1996.
(Continued)

*Primary Examiner* — Jacob T Minskey
(74) *Attorney, Agent, or Firm* — Oliff PLC (57) ABSTRACT

A method for optimizing reduction and content of total titratable alkali of green liquor of a recovery boiler. The method comprises producing green liquor in a dissolving tank by conveying smelt and weak white liquor into the dissolving tank and measuring at least the contents of sodium sulphate, sodium hydroxide, sodium sulphide, and sodium carbonate of the green liquor. The method comprises controlling at least a process parameter of a recovery boiler to maximize the reduction of the recovery boiler and controlling the flow of the weak white liquor into the dissolving tank to optimize the content of total titratable alkali of the green liquor. In addition, a system for producing green liquor with optimized reduction and content of total titratable alkali. The system comprises a first sensor arrangement, a first and a second regulator, and a processing unit arrangement configured to perform the method.

22 Claims, 5 Drawing Sheets

(51) Int. Cl.
    *C01D 1/04*     (2006.01)
    *C01D 5/00*     (2006.01)
    *C01D 7/00*     (2006.01)
    *D21C 11/00*     (2006.01)
    *D21C 11/12*     (2006.01)
    *D21C 11/10*     (2006.01)

(52) U.S. Cl.
    CPC ............ *C01D 7/00* (2013.01); *D21C 11/0064* (2013.01); *D21C 11/10* (2013.01); *D21C 11/122* (2013.01)

(56) References Cited

U.S. PATENT DOCUMENTS

| | | | |
|---|---|---|---|
| 5,667,201 A * | 9/1997 | Beveridge | D21C 11/122 |
| | | | 222/590 |
| 5,735,331 A | 4/1998 | Engdahl et al. | |
| 5,820,729 A * | 10/1998 | Ericsson | B01F 1/00 |
| | | | 162/30.1 |
| 2002/0119083 A1 * | 8/2002 | Kuoksa | D21C 11/0064 |
| | | | 422/185 |

FOREIGN PATENT DOCUMENTS

| | | |
|---|---|---|
| WO | 84/04552 A1 | 11/1984 |
| WO | 00/73577 A1 | 12/2000 |
| WO | 2013/071008 A2 | 5/2013 |

OTHER PUBLICATIONS

Frederick et al. "Pirssonite Deposits in Green Liquor Processing", Tappi Journal, pp. 135-140, 1990.
Apr. 13, 2017 Office Action issued in Finnish Patent Application No. 20165695.
Grace et al. "Critical Issues in Smelt Dissolving Tank Operation", International Chemical Recovery Conference, vol. 2, pp. 108-113, 2010.
Feb. 9, 2018 European Search Report issued in European Patent Application No. 17397520.2.

* cited by examiner

METHOD AND A SYSTEM FOR QUALITY OPTIMIZATION OF GREEN LIQUOR

TECHNICAL FIELD

The invention relates to pulp and paper industry. The invention relates process control of chemical cycle of a pulp mill. The invention relates to control of flow of weak white liquor through a dissolving tank, which is arranged in connection with a recovery boiler, and from which green liquor is received. The invention relates to quality optimization of the green liquor.

BACKGROUND

Figure 1:
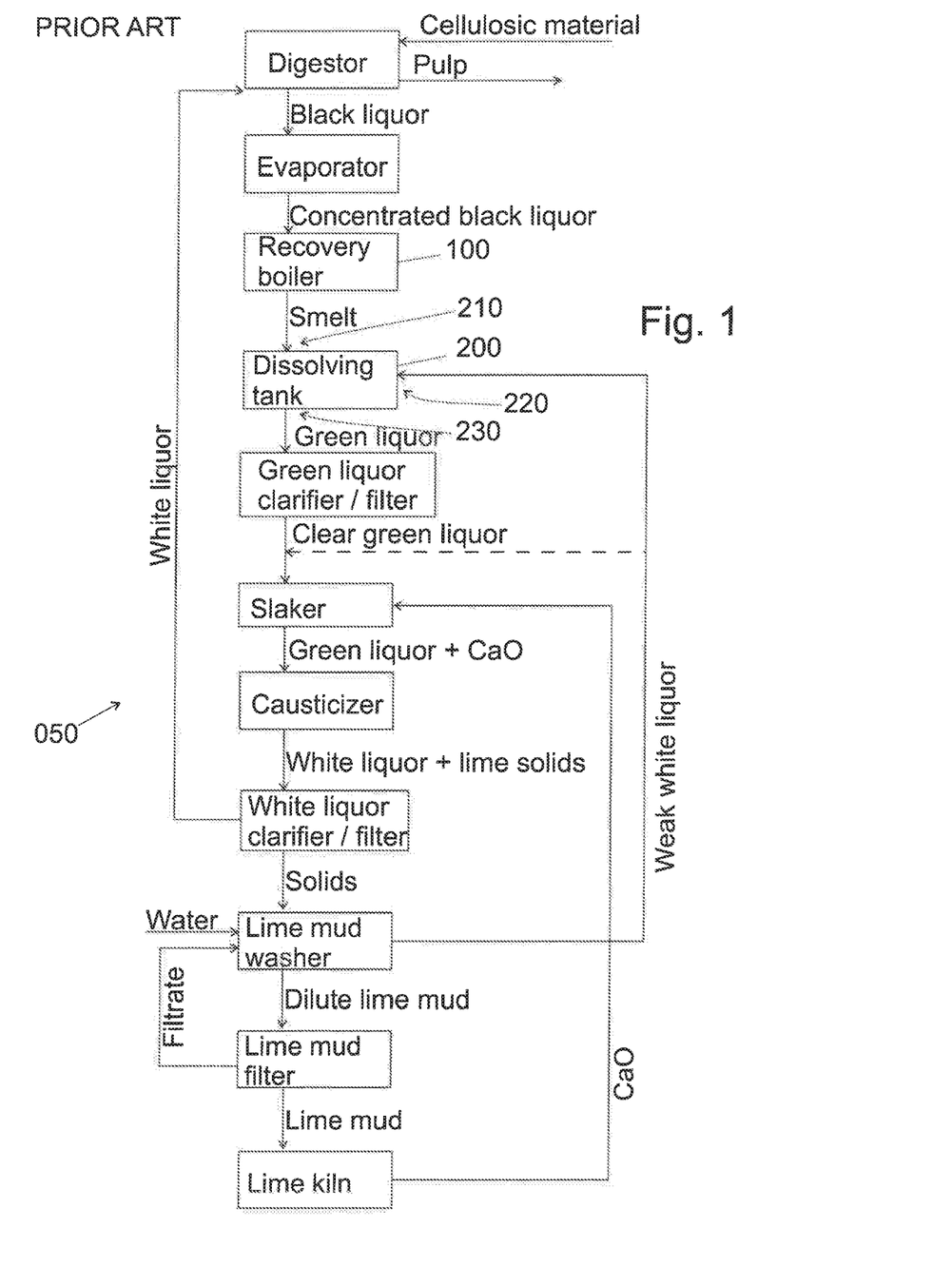
FIG. 1 shows a chemical cycle of a pulp mill of prior art.

A typical chemical circulation of a pulp mill is shown in FIG. 1. Process chemicals are recovered to a char bed of a recovery boiler by burning concentrated black liquor therein. From the char bed smelt should flow in a continuous manner to a dissolving tank. In the dissolving tank, the smelt is dissolved in weak white liquor to produce green liquor.

In a solution known from EP0524743, the sodium carbonate concentration of green liquor is regulated by measuring the conductivity of the green liquor. From measurements, the sodium carbonate concentration is determined, and the flow of weak white liquor can be adjusted to maintain a proper sodium carbonate concentration. From FI114813 it is known that the density of green liquor correlates with total titratable alkali (TTA) of the green liquor.

The concentration of chemicals within the green liquor should be high in order to efficiently recover chemical in subsequent steps of the process. In the document EP0524743, the amount of white liquor fed to the dissolving tank is controlled by using the measured conductivity of green liquor to control the concentration of chemicals in the green liquor.

The aforementioned solution has thus several drawbacks. First, since only the electrical conductivity is measured, the sodium carbonate concentration is not accurate. Second, also other compounds that sodium carbonate affect the process of dissolving. Some compounds may solidify, provided that that the concentration are too high. Third, in the process, in particular sodium sulphide should be recovered, while the content of sodium sulphate is less important. Thus, the reduction of the green liquor should also be maximized. However, by controlling only the flow of weak white liquor, reduction cannot be affected.

The aim of the present invention is to overcome at least some of the drawbacks of prior art.

SUMMARY

In a method, green liquor is formed by conveying smelt from a recovery boiler and weak white liquor into a dissolving tank. The content of sodium sulphate ($Na_2SO_4$), the content of sodium hydroxide (NaOH), the content of sodium sulphide ($Na_2S$), and the content of sodium carbonate ($Na_2CO_3$) of the green liquor are measured. Then, by using the measured values, the flow of the weak white liquor into the dissolving tank is controlled to optimize the content of total titratable alkali (TTA) of the green liquor. Moreover, the measured values bear evidence on the reduction of the recovery boiler. Therefore, by using the measured values, at least a process parameter of the recovery boiler is controlled to maximize the reduction of the recovery boiler. A corresponding system is also disclosed.

In a preferable embodiment, also the temperature of green liquor is measured. In the embodiment, a maximum allowable value for a quantity indicative of at least an amount of a component of pirssonite ($Na_2Ca(CO_3)_2 \cdot 2H_2O$) in the green liquor on the condition that the solubility limit of pirssonite is not exceeded is determined. Such a maximum value can be determined e.g. from published tables. Such a quantity may be e.g. total titratable alkali (TTA) or total content of sodium. Moreover, by using the measured contents of sodium sulphate ($Na_2SO_4$), sodium hydroxide (NaOH), sodium sulphide ($Na_2S$), and sodium carbonate ($Na_2CO_3$), a value of the quantity indicative of at least an amount of a component of pirssonite ($Na_2Ca(CO_3)_2 \cdot 2H_2O$) in the green liquor is calculated in the embodiment. In the embodiment, the flow of weak white liquor into the dissolving tank is controlled by using these values in such a way that the content of total titratable alkali (TTA) of the green liquor is maximized on the condition that solid pirssonite is not formed in the green liquor.

The invention is disclosed more specifically in the claims.

DETAILED DESCRIPTION

Figure 2:
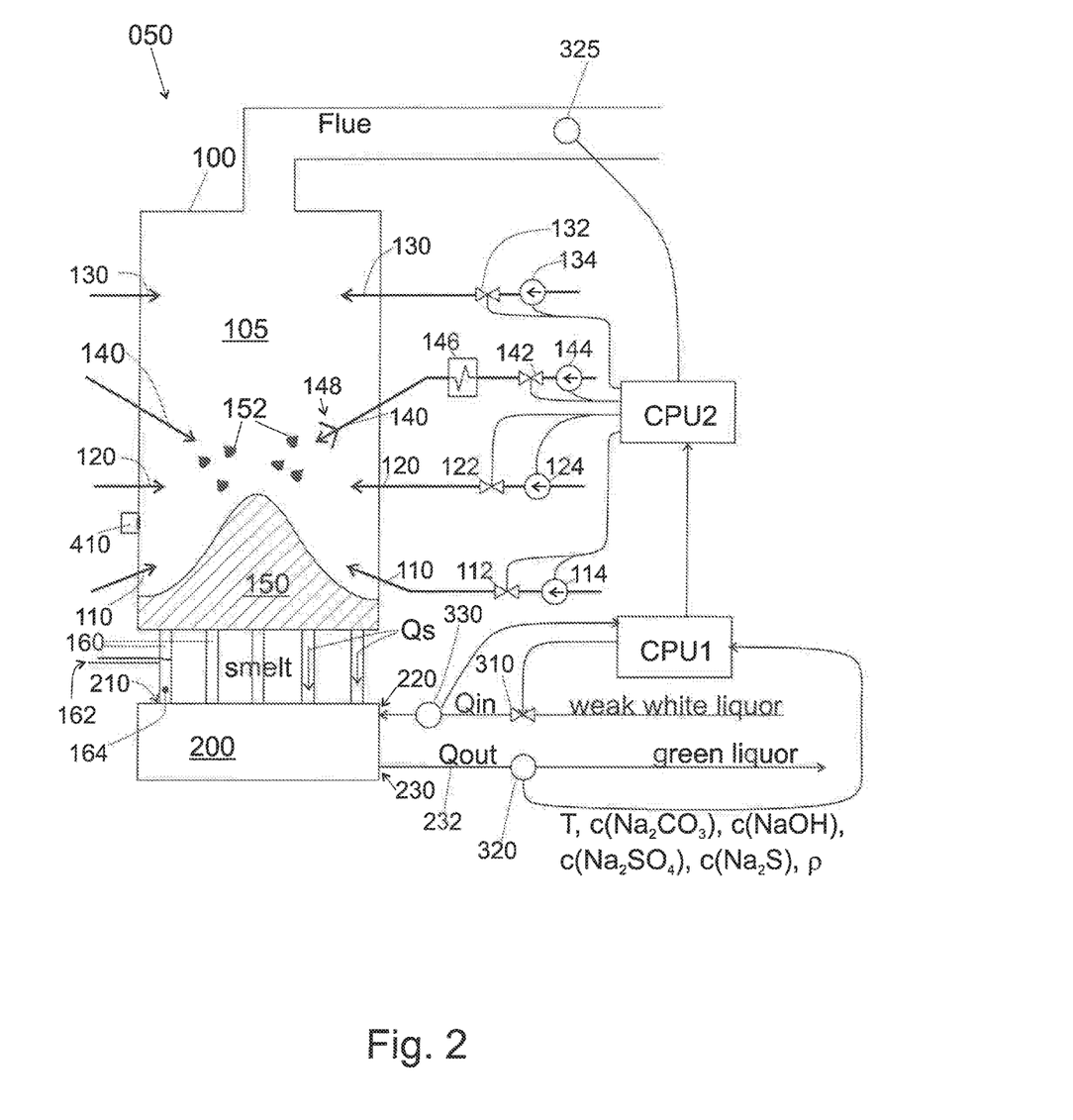
FIG. 2 shows an embodiment of a method and a system for optimizing the content of total titratable alkali and maximizing the reduction of the recovery boiler.

Referring to FIGS. 1 and 2, a system 050 for producing green liquor with optimized content of total titratable alkali comprises a recovery boiler 100 configured to burn concentrated black liquor to produce heat and smelt. The smelt flows into a dissolving tank 200, where it dissolves in weak white liquor. The dissolving tank 200 comprises a first inlet 210 for receiving smelt from the recovery boiler 100, a second inlet 220 for receiving weak white liquor, and an outlet 230 for green liquor. The system 050 further comprises a first regulator 310 configured to regulate the flow of the weak white liquor into the dissolving tank 200.

As for the terms used in the field and this description:
white liquor refers to a reasonably strong aqueous solution of sodium hydroxide (NaOH).
weak white liquor refers to a dilute aqueous solution of sodium hydroxide (NaOH), or even water without or substantially without NaOH.
black liquor is the waste product from the Kraft process when digesting pulpwood into paper pulp removing lignin, hemicelluloses and other extractives from the wood to free the cellulose fibers.
green liquor is the dissolved smelt from the recovery boiler 100 in the Kraft process. Green liquor comprises multiple compounds comprising sodium. Components of green liquor include sodium carbonate ($Na_2CO_3$), sodium sulphate ($Na_2SO_4$), sodium hydroxide (NaOH), and sodium sulphide ($Na_2S$).

pirssonite is hydrated sodium calcium carbonate having the formula $Na_2Ca(CO_3) \cdot 2H_2O$.

lime is a calcium-containing inorganic material in which carbonates, oxides and hydroxides predominate. Lime may refer to calcium oxide (CaO).

lime mud is water-base mud that comprises calcium carbonate ($CaCO_3$).

molar concentration refers to a specific amount of a compound in a substance, such as sodium hydroxide in green liquor or white liquor. The molar concentration of a compound X is denoted by c(X), wherein X is the compound in question e.g. the concentration of NaOH of the green liquor is denoted by c(NaOH). The substance, in which the compound X is solved, is written out when considered necessary. Unless otherwise specified, the concentration refers to the concentration of the compound in green liquor. The terms content and concentration are used interchangeably. The term concentration or content refers to molar concentration, unless otherwise explicitly stated.

g/l as NaOH or g/l as $Na_2O$. In the art, it is common to use a unit of "g/l as NaOH" or "g/l as $Na_2O$" for the molar concentration. If such a unit is needed, the molar concentration (mol/l) should be multiplied by the molar mass of NaOH or $Na_2O$ to obtain the concentrations in the unit of "g/l as NaOH" or "g/l as $Na_2O$", respectively. The molar mass is expressed is units of g/mol. Conversely, if the mass concentration of a compound, such as sodium sulphate ($Na_2SO_4$) or sodium carbonate ($Na_2CO_3$), is known, the molar concentration thereof can be found by dividing by the molar mass of the compound.

total titratable alkali (TTA) refers to the total molar concentration (in mol/l or "g/l as NaOH" or "g/l as $Na_2O$") of NaOH, $Na_2S$ and $Na_2CO_3$ of the green liquor, i.e. $c(NaOH)+c(Na_2S)+c(Na_2CO_3)$.

total sodium refers to the total molar concentration (in mol/l) of compounds that comprise sodium in green liquor. Typically total sodium is reasonably accurately TTA added by the molar concentration of $Na_2SO_4$.

active alkali (AA) refers to the total molar concentration of NaOH and $Na_2S$, i.e. $c(NaOH)+c(Na_2S)$.

reduction refers to ratio $c(Na_2S)/[c(Na_2S)+c(Na_2SO_4)]$, wherein $c(Na_2S)$ and $c(Na_2SO_4)$ are molar concentrations (in mol/l) of sodium sulphide and sodium sulphate of the green liquor. Because of the ratio, the units g/l should not be used to calculate reduction.

combustion air refers to air that is fed to the furnace of the recovery boiler in order to burn concentrated black liquor. The combustion air typically comprises at least primary air and secondary air.

upper combustion air refers to combustion air that is fed to the furnace of the recovery boiler at a vertical level that is located higher in the furnace than the level at which black liquor is fed to the furnace. Tertiary air and quaternary air are examples of upper combustion air. Sometimes the secondary air may be fed above the char bed.

flow refers the action or fact of material moving in a stream.

flow rate refers the time derivative of the amount of flown material. The amount may be e.g. molar amount, mass, or volume. Typical units include mass per time and volume per time, such as kg/s or $m^3/h$.

Figure 4A:
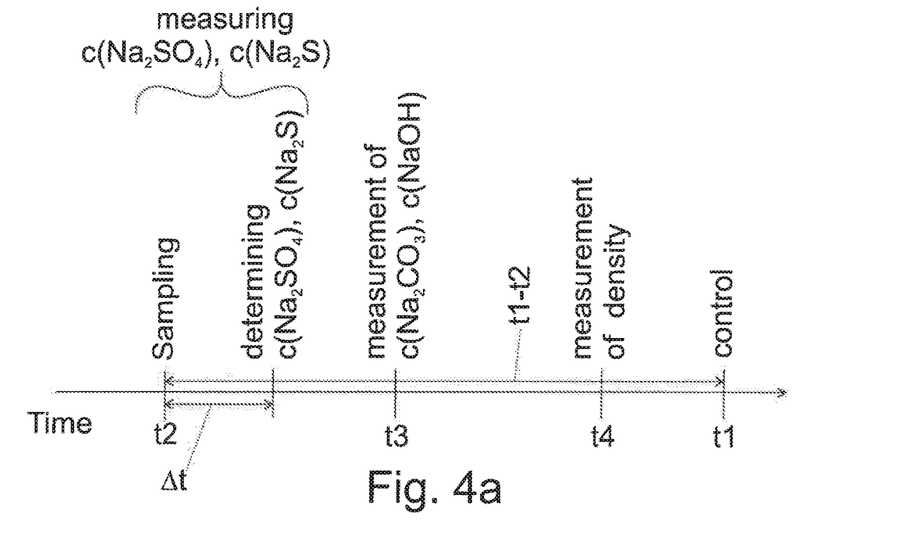
FIG. 4a shows the temporal order in which some measurements and control may be made.

As indicated in FIGS. 1 and 2, a purpose of a recovery boiler 100 is to recover pulping chemicals into smelt and thereafter to green liquor. To recover a chemical without excess circulation of liquids, the TTA of the green liquor should be maximized. Having a maximal TTA improves the energy balance of the process and increases the capacity of the pulp mill. In principle, the more weak white liquor is used to dilute smelt, the less is the TTA. However, The amount of weak white liquor should be sufficient to dissolve the smelt in such a way that compounds of the green liquor will not solidify later on in the process. In particular, when the concentration of chemicals is too high, solid pirssonite may be formed into the green liquor. This causes malfunction of the system and long maintenance breaks Therefore, an embodiment comprises controlling the flow rate of the weak white liquor into the dissolving tank by using a measured content of sodium sulphate ($Na_2SO_4$), a measured content of sodium hydroxide (NaOH), a measured content of sodium sulphide ($Na_2S$), and a measured content of sodium carbonate ($Na_2CO_3$) to optimize the content of total titratable alkali (TTA) of the green liquor. An embodiment comprises automatically controlling the flow rate of the weak white liquor into the dissolving tank in the way described above (or below). An embodiment comprises controlling the flow rate of the weak white liquor into the dissolving tank by using a processing unit arrangement (CPU1, CPU2, CPU3) in the way described above (or below). The control takes place at a first instance of time t1. The process may be controlled also at a subsequent first instance of time t1' (see FIG. 4 for different instances of time).

In the pulp and paper industry, the recovery of sodium sulphide in a recovery boiler is important to the pulp manufacturer, as the chemical is used in pulping to break the lignin of the fibres to produce pulp. In a Kraft pulp mill, the concentrated black liquor comprises sodium sulphate ($Na_2SO_4$) because of the sulphate process, and the recovery boiler converts a part thereof to sodium sulphide ($Na_2S$) according to the reaction $$2C+Na_2SO_4 \rightarrow 2CO_2+Na_2S.$$

As indicated above, the molar ratio $c(Na_2S)/[c(Na_2S)+c(Na_2SO_4)]$ is conventionally called the reduction; and as motivated above, also the reduction should be maximized. Correspondingly, the process should be controlled such that the content of $Na_2S$ is maximized and the content of $Na_2SO_4$ is minimized.

Reduction occurs in the recovery boiler 100 (see FIG. 2). The reduction process can be controlled by controlling at least a process parameter of the recovery boiler. Typically, the temperature within the recovery boiler should be high for the reaction to occur. However, at the same time, the oxygen content should be such that not all carbon is burned, but some carbon participates in the reduction reaction.

In this way, an embodiment comprises controlling at least a process parameter of the recovery boiler by using the measured content of sodium sulphate ($Na_2SO_4$) and the measured content of sodium sulphide ($Na_2S$) to maximize the reduction of the recovery boiler. In an embodiment, at least a process parameter of the recovery boiler 100 in controlled in such a way that the reduction of the recovery boiler 100 is at least 95%.

In order to control the dilution process and the recovery boiler, the corresponding quantities are measured. As for TTA, an embodiment comprises measuring the content of sodium hydroxide (NaOH), the content of sodium sulphide ($Na_2S$), and the content of sodium carbonate ($Na_2CO_3$) of the green liquor. In this way, the TTA of the green liquor can be calculated as indicated above. As for reduction, an embodiment further comprises measuring the content of sodium sulphate ($Na_2SO_4$) of the green liquor. It is noted that the content of sodium sulphide ($Na_2S$) is measured for purposes of both TTA and reduction. In this way, the reduction of the green liquor can be calculated as indicated above. As is evident, the reduction of the green liquor bears evidence on the reduction in the recovery boiler, since the weak white liquor is substantially free from both $Na_2SO_4$ and $Na_2S$.

Referring to FIG. 2, a corresponding system 050 comprises a first sensor arrangement 320 configured to measure at least the content of sodium sulphate ($Na_2SO_4$), the content of sodium hydroxide (NaOH), the content of sodium sulphide ($Na_2S$), and the content of sodium carbonate ($Na_2CO_3$) of the green liquor. The first sensor arrangement 320 is configured to give a signal or signals indicative of the values of the measured quantities, i.e. indicative of the measured values of the content of sodium sulphate ($Na_2SO_4$), the content of sodium hydroxide (NaOH), the content of sodium sulphide ($Na_2S$), and the content of sodium carbonate ($Na_2CO_3$) of the green liquor. The system comprises a processing unit arrangement CPU1, CPU2, CPU3 is configured to control the flow rate of the weak white liquor into the dissolving tank by using the first regulator and the signal(s) from the first sensor arrangement. In FIG. 2, T refers to the temperature and the concentrations c(•) refer to the aforementioned four concentrations c($Na_2CO_3$), c($Na_2SO_4$), c(NaOH), and c($Na_2S$); and ρ refers to density, as will be discussed.

Referring to FIG. 2, to control also the recovery boiler 100, a corresponding system comprises a at least a second regulator (112, 114, 122, 124, 132, 134, 142, 144, 146, 148) configured to regulate at least a process parameter of the recovery boiler 100. Moreover, in that embodiment, the processing unit arrangement CPU1, CPU2 is configured to control at least the process parameter of the recovery boiler by using the at least second regulator. As is evident, the second regulator (112, 114, 122, 124, 132, 134, 142, 144, 146, 148) may be configured to regulate multiple process parameters of the recovery boiler 100. As is evident, at least another regulator may be configured to regulate other process parameters of the recovery boiler 100. The processing unit arrangement may comprise only one processing unit CPU1, or it may comprise multiple processing units CPU1, CPU2, CPU3. A processing unit CPU1 may be configured to send data to another processing unit CPU2. The processing unit arrangement is configured to control a process parameter of the recovery boiler by using the second regulator and the signal(s) from the first sensor arrangement in such a way that the reduction of the green liquor is maximized.

A process parameter, i.e. a controllable process parameter, of the recovery boiler that is controlled may be e.g. one of
the amount of combustion air in the recovery boiler 100,
the distribution of combustion air in the recovery boiler 100,
the pressure of combustion air,
the flow velocity of combustion air,
the pressure of the concentrated black liquor, which is fed to the furnace 105 of the recovery boiler 100,
the temperature of the concentrated black liquor,
the flow velocity of the concentrated black liquor, and
size of an orifice of a nozzle 148 used to feed black liquor into the recovery boiler.

However, the (controllable) process parameters affect some observable process parameters, in particular the carbon monoxide (CO) content of flue gas. The carbon monoxide CO, in addition to e.g. nitrogen oxide NOx emissions, affect fouling and corrosion within the boiler. Therefore, the process parameters of the recovery boiler are, in an embodiment, controlled also such that the CO emission, the NOx emission, fouling and corrosion are within an acceptable level. In particular, the CO content of the flue gas is indicative of the completeness of the burning process. Moreover, as indicated above, some carbon should be available for the reduction. Thus, an embodiment comprises measuring the carbon monoxide content of the flue gas of the recovery boiler 100. A corresponding embodiment comprises a fourth sensor arrangement 325 (see FIG. 2) configured to measure the CO content of flue gas of the recovery boiler 100. The fourth sensor arrangement 325 may comprise e.g. a spectrometer. The fourth sensor arrangement 325 is configured to send a signal indicative of the CO content of flue gas to the processing unit arrangement CPU1, CPU2. The CO content may be measured from flue gas within the furnace or from flue gas within a flue gas channel.

As indicated above, one or more of the parameters may be controlled, depending on the need. The combustion air refers to primary combustion air, secondary combustion air, or upper combustion air, such as tertiary air, or a total amount of at least two of these combustion airs. The distribution of combustion air refers to a ratio of flow rates of two of the aforementioned combustion airs. Correspondingly, the recovery boiler comprises a primary channel 110 for feeding primary combustion air, a secondary channel 120 for feeding secondary combustion air, and an upper channel 130 for feeding upper combustion air.

The size of the black liquor droplets 152 can be controlled by the pressure of the concentrated black liquor fed to the recovery boiler and/or the flow rate of the concentrated black liquor and/or the temperature of the concentrated black liquor, and optionally with the nozzles 148 used to feed the concentrated black liquor to the furnace 105 of the recovery boiler 100. The temperature affects the viscosity, which also affects the size of the droplets. Correspondingly, the recovery boiler comprises a channel 140 for feeding concentrated black liquor.

The height of the char bed 150 of the recovery boiler may be controlled by the amount of combustion air fed to the boiler. Typically, the amount of black liquor is not controlled, since the digester (see FIG. 1) produces black liquor, of which all is treated in the recovery boiler 100. In addition, the division of combustion air to different vertical levels affects the height of the char bed, as well as the droplet size of the black liquor. Preferably, these parameters are controlled in such a way that the size of the char bed 150 remains substantially constant during the process (except for the start-up). An embodiment comprises measuring the size of the char bed 150. The system 050 may comprise a sensor, e.g. the sensor 410, configured to measure the size of the char bed 150. The processing unit arrangement CPU1, CPU2 may be configured to receive, from the sensor, a signal indicative of the size of the char bed 150. An embodiment comprises controlling at least a process parameter of the recovery boiler 100 by using the measured size of the char bed to minimize a temporal variation of the size of the char bed. The processing unit arrangement CPU1, CPU2 may be configured to control at least a process parameter of the recovery boiler 100 by using the measured size of the char bed in such a way that a temporal variation of the size of the char bed is minimized.

These process parameters affect also the temperature within the recovery boiler. As indicated in FIG. 2, the flow rate and/or pressure of the primary, secondary and/or upper combustion air may be controlled with a valve (112, 122, 132) and/or a pump (114, 124, 134). FIG. 2 shows the valve 112 and pump 114 for the primary air, the valve 122 and pump 124 for the secondary air, and the valve 132 and pump 134 for the tertiary air. As indicated in FIG. 2, the size of the black liquor droplets may be controlled with [i] a valve 142 and/or [ii] a pump 144 and/or [iii] a heater 146 or a cooler 146 and/or [iv] a nozzle 148. In addition, the number and size of nozzles 148 used to feed the black liquor affects the droplet size. By not using some of the nozzles 148, the number of nozzles 148 used to feed the black liquor can be decreased to affect the droplet size. By using or not using a corresponding pump 144, the use of a nozzle for the purpose can be controlled. In addition, a nozzle 148 itself may be controllable. For example, the size of an orifice used to feed black liquor could be controllable. The heater/cooler 146 may be a heat exchanger or an electrical heater. FIG. 2 shows the valve 142, pump 144, the heat exchanger 146, and the nozzle 148 for the concentrated black liquor.

As indicated in FIG. 2, when a second processing unit CPU2, which is a part of the processing unit arrangement, the second processing unit CPU2 controls the process parameters of the recovery boiler 100 and a first processing unit CPU1 controls the parameters of the dissolving tank 200, the first processing unit CPU1 provides information to the second processing unit CPU2. In such a case, CPU1 comprises a block for sending data and CPU2 comprises a block for receiving data. As evident, a single processing unit CPU1 may be used to control both the processes of dissolving smelt and recovering $Na_2S$ (i.e. burning black liquor).

Figure 3A:
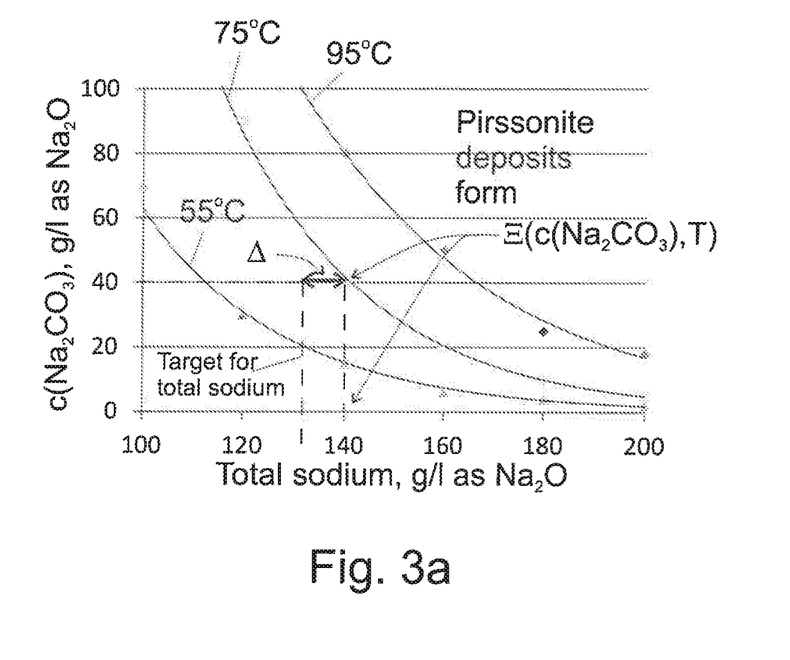
FIG. 3a shows the solubility limit of pirssonite as function of content of sodium carbonate, total sodium content, and temperature.
Figure 3B:
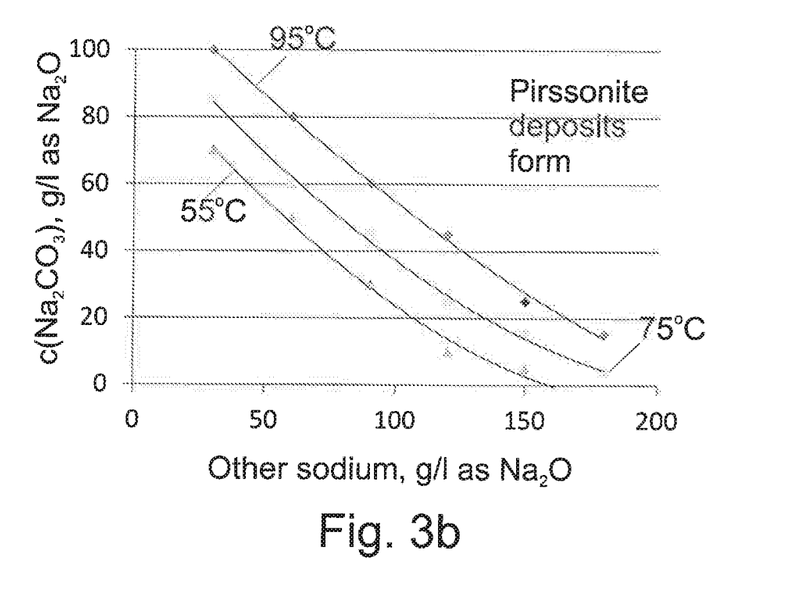
FIG. 3b shows the solubility limit of pirssonite as function of content of sodium carbonate, content of other sodium components, and temperature.

As indicated above, if the TTA is too high, there is a risk of solidifying some components of the green liquor. An example of such a solid is pirssonite ($Na_2Ca(CO_3)_2.2H_2O$). FIGS. 3a and 3b show the solubility limit of pirssonite in green liquor. FIG. 3a shows the solubility limit of pirssonite in terms of total sodium (see above), molar concentration of sodium carbonate (i.e. $c(Na_2CO_3)$) and temperature. As for molar concentration and the unit "g/l as $Na_2O$", see above.

Typically, the main compounds of green liquor that comprise sodium are sodium sulphate ($Na_2SO_4$), sodium hydroxide (NaOH), sodium sulphide ($Na_2S$), and sodium carbonate ($Na_2CO_3$). Moreover, the green liquor may comprise sodium thiosulphate ($Na_2S_2O_3$), typically only to a minor amount.

In some cases, it is beneficial to know accurately the total sodium of the green liquor. Thus, an embodiment on the method comprises measuring the content of sodium thiosulphate ($Na_2S_2O_3$) of the green liquor. If needed, the content of also other compounds that contain sodium may be measured. Correspondingly, in an embodiment, the first sensor arrangement 320 is configured to measure also the content of sodium thiosulphate ($Na_2S_2O_3$) of the green liquor. The first sensor arrangement 320 may be configured to measure also the content of other compounds that contain sodium.

Since the total sodium is approximately the same as TTA added by $c(Na_2SO_4)$, the solubility limit of pirssonite, in terms of TTA (see above), depends on the molar concentration of sodium carbonate, molar concentration of $Na_2SO_4$, and temperature. For more accurate data on the solubility of pirssonite in green liquor, the reader is referred to [1] Salmenoja, K. and Kosonen, J. "Solving deposit problems in the smelt dissolving tank", Tappi Engineering conference 1996 p. 793-797 or [2] Frederick, W. J. Jr., Krishnan, R., and Ayers, R. J. "Pirssonite deposits in green liquor processing", February 1990 Tappi Journal p. 135-140.

In this way:
when $c(Na_2CO_3)$ and temperature are known, one can determine a maximum value $\Xi(c(Na_2CO_3),T)$ of total sodium (e.g. from FIG. 3a) in the green liquor on the condition that the solubility limit of pirssonite is not exceeded OR when $c(Na_2CO_3)$, $c(Na_2SO_4)$, and temperature are known, one can determine a maximum value of TTA (as indicated above) in the green liquor on the condition that the solubility limit of pirssonite is not exceeded.

In this way, either the total sodium or TTA can be considered as a quantity that is indicative of at least an amount of a pirssonite ($Na_2Ca(CO_3)_2.2H_2O$) forming component in the green liquor. In this way, an embodiment of a method comprises measuring also the temperature of green liquor. The embodiment further comprises determining, using the measured temperature, the measured content of sodium carbonate ($Na_2CO_3$), and optionally the measured content of sodium sulphate ($Na_2SO_4$), a maximum allowable value for a quantity indicative of at least an amount of a pirssonite ($Na_2Ca(CO_3)_2.2H_2O$) forming component in the green liquor on the condition that the solubility limit of pirssonite is not exceeded. To illustrate this, referring to FIG. 3a, e.g. when the sodium carbonate concentration of green liquor is $c(Na_2CO_3)=40$ [g/l as $Na_2O$] and the temperature T of the green liquor is T=75° C., the maximum value $\Xi(c(Na_2CO_3),T)$ for the total sodium on the condition that the solubility limit of pirssonite is not exceeded is 140 g/l as $Na_2O$. The maximum of the quantity on the condition that the solubility limit of pirssonite is not exceeded is be denoted $\Xi(c(Na_2CO_3),T)$. As indicated by this notation, the maximum is a function of concentration of sodium carbonate $c(Na_2CO_3)$ and temperature T. Should the total sodium exceed this value, the operational point would be on the upper right side of the solubility curve of pirssonite at 75° C., and some pirssonite would be solidified. To take advantage of such information, in an embodiment, at least the temperature and the concentration of sodium carbonate $c(Na_2CO_3)$ are measured.

Referring to FIG. 2, in a corresponding system 050, the first sensor arrangement 320 if configured to measure also the temperature T of the green liquor. The first sensor arrangement 320 can be configured to measure these values in the dissolving tank 200, at an outlet 230 of the dissolving tank, or from a pipeline 232 configured to convey green liquor from the dissolving tank 200. Moreover, the processing unit arrangement CPU1 in an embodiment is configured to determine, using the measured temperature T and the measured content of sodium carbonate, a maximum allowable value for a quantity indicative of at least an amount of a pirssonite ($Na_2Ca(CO_3)_2.2H_2O$) forming component in the green liquor on the condition that the solubility limit of pirssonite is not exceeded.

Moreover, by using the measured values, one can determine the value of the quantity indicative of at least an amount of a pirssonite ($Na_2Ca(CO_3)_2.2H_2O$) forming component. Such quantity may be e.g. the TTA or the total sodium (see above). As evident from the above discussion, the quantity could be, in the alternative, TTA, from which any one or two of $c(NaOH)$, $c(Na_2S)$, or $c(Na_2CO_3)$ are subtracted, and correspondingly, the maximum value of the quantity in the green liquor on the condition that the solubility limit of pirssonite is not exceeded would depend also on the subtracted quantities.

In this way, an embodiment of the method comprises determining a value of the quantity indicative of at least an amount of the pirssonite ($Na_2Ca(CO_3)_2.2H_2O$) forming component in the green liquor.

Referring to FIG. 3a, provided that the quantity indicative of at least an amount of the pirssonite ($Na_2Ca(CO_3)_2.2H_2O$)

forming component in the green liquor (e.g. TTA or total sodium) is less than the maximum allowable value $\Xi(c(NA_2CO_3),T)$ (later denoted by E for short) for the quantity, the flow rate of weak white liquor can be reduced to increase the concentrations, in particular TTA. To prevent the formation of pirssonite, a safety margin $\Delta$ may be subtracted from the maximum allowable value $\Xi$ for the quantity to obtain a target value $\Xi-\Delta$ for the quantity. Correspondingly, provided that the quantity indicative of at least an amount of the pirssonite ($Na_2Ca(CO_3)_2.2H_2O$) forming component in the green liquor (e.g. TTA or total sodium) is more than the value $\Xi-\Delta$ for the quantity, the flow rate of weak white liquor can be increased to reduce the concentrations, in particular TTA, in order to prevent pirssonite formation.

Thus, the flow rate of weak white liquor into the dissolving tank may be controlled so that the value of the quantity is optimized towards the target value $\Xi-\Delta$ (e.g. by decreasing the flow rate to increase the value of the quantity and by increasing the flow rate to decrease the value of the quantity). The flow rate may be controlled at a first instance of time t1 (FIG. 4a; and also at a subsequent first instance of time t1').

In this way, an embodiment of the method comprises controlling, at the first instance of time t1, the flow rate of the weak white liquor into the dissolving tank by using [i] the maximum allowable value $\Xi$ for the quantity indicative of at least an amount of a pirssonite ($Na_2Ca(CO_3)_2.2H_2O$) forming component in the green liquor on the condition that the solubility limit of pirssonite is not exceeded, and [ii] the value of the quantity indicative of at least an amount of the pirssonite ($Na_2Ca(CO_3)_2.2H_2O$) forming component in the green liquor in such a way that the content of total titratable alkali (TTA) of the green liquor is maximized on the condition that solid pirssonite ($Na_2Ca(CO_3)_2.2H_2O$) is not formed in the green liquor.

In a corresponding system, the processing unit arrangement CPU1, CPU2 is configured to control the flow rate of the weak white liquor into the dissolving tank 200 by using the first regulator 310 and the signal(s) from the first sensor arrangement 320 in such a way that the content of total titratable alkali (TTA) of the green liquor is maximized on the condition that solid pirssonite ($Na_2Ca(CO_3)_2.2H_2O$) is not formed in the green liquor. The processing unit arrangement may be configured to perform the aforementioned method as discussed in more detail above.

As indicated above, an embodiment of the method comprises determining, using at least the measured temperature T, the measured content of sodium carbonate $c(Na_2CO_3)$, and information on the solubility of pirssonite in the green liquor (as indicated in FIGS. 3a and 3b), a theoretical maximum value $\Xi(c(NA_2CO_3),T)$ for the quantity indicative of at least an amount of a component of pirssonite on the condition that solid pirssonite ($Na_2Ca(CO_3)_2.2H_2O$) is not formed in the green liquor. In an embodiment, the information on the solubility of pirssonite in the green liquor includes information on the solubility of pirssonite in the green liquor as function of at least temperature. In an embodiment, the information on the solubility of pirssonite in the green liquor includes information on the solubility of pirssonite in the green liquor as function of at least temperature and concentration $c(Na_2CO_3)$ of sodium carbonate.

The embodiment further comprises determining a safety margin $\Delta$ for the quantity indicative of at least an amount of a component of pirssonite, and determining a target value for the quantity indicative of at least an amount of a component of pirssonite by subtracting the safety margin $\Delta$ from the theoretical maximum value $\Xi(c(NA_2CO_3),T)$. As indicated above, the flow rate of weak white liquor may be controlled to optimize the value of the quantity towards the target value $\Xi(c(NA_2CO_3),T)-\Delta$.

As indicated in background, this far, the concentrations of green liquor have been measured indirectly, i.e. by correlating a measured value with a concentration or a sum of concentrations. For example, the electrical conductivity or the density, or some spectral analysis may be correlated in such a way. However, such measurements are not accurate, at least in the long run, when the measurement results drift. Therefore, such measurement results are not accurate in the long run and/or the measurement methods need to be calibrated regularly with some reference measurement. Reference measurements are typically performed according to a standard. The measurement of $c(Na_2S)$, $c(NaOH)$, and $c(Na_2CO_3)$ is described in the standard SCAN 30-85, dated April 1985. The measurement of $c(Na_2SO_4)$ is described in the standard SFS-5738, dated 21 Sep. 1992. Also other standardized methods are known. The standardized measurements are based on titration.

New measurement solutions have enabled direct measurements of each one of the aforementioned concentrations. In an embodiment, at least one or all of the concentrations $c(Na_2CO_3)$, $c(NaOH)$, and $c(Na_2S)$ is measured according to the standard SCAN 30-85 dated April 1985 and $c(Na_2SO_4)$ is measured according to the standard SFS-5738 dated 21 Sep. 1992. In an embodiment, at least some of the concentrations $c(Na_2CO_3)$, $c(Na_2SO_4)$, $c(NaOH)$, and $c(Na_2S)$ are measured by titration. In an embodiment, all the concentrations $c(Na_2CO_3)$, $c(Na_2SO_4)$, $c(NaOH)$, and $c(Na_2S)$ are measured by titration. In an embodiment, the first sensor arrangement 320 is configured [i] to measure at least one or all of the concentrations $c(Na_2CO_3)$, $c(NaOH)$, and $c(Na_2S)$ according to the standard SCAN 30-85 dated April 1985 and [ii] to measure $c(Na_2SO_4)$ is measured according to the standard SFS-5738 dated 21 Sep. 1992. In an embodiment, the first sensor arrangement 320 comprises a titrimeter configured to measure at least some or all of the concentrations $c(Na_2CO_3)$, $c(Na_2SO_4)$, $c(NaOH)$, and $c(Na_2S)$ by titration. A standardized measurement and/or a titration measurement yields accurate results on the concentrations. The titrimeter may be configured to measure at least some of the concentrations such that only one concentration at a time is measured. The other concentrations may be measured subsequently. In the alternative, the first sensor arrangement 320 may comprise at least two titrimeters, such as four titrimeters. Accurate measurements help to decrease the safety margin $\Delta$, and in this way improves the optimization of TTA, e.g. by maximizing TTA of the condition that solids are not formed.

By using the measured concentrations and temperature, it is possible to use a reasonably small safety margin $\Delta$. In contrast, if a concentration is measured only indirectly, such as by correlating a measured density or a measured resistivity value with a calibration curve, a much larger safety margin would be needed because of the inaccuracy of the measurement. An embodiment comprises using a safety margin $\Delta$ that is at most 10% of the maximum allowable value $\Xi$. Moreover, by using proactive control, as discussed later, an even smaller safety margin can be used. An embodiment comprises using a safety margin $\Delta$ that is at most 7% or at most 5% of the maximum allowable value $\Xi$.

A measurement herein is understood as comprising sampling and determining the value of the quantity that is measured. There may be some temporal delay $\Delta t$ in between sampling and determining the value, as indicated in FIG. 4. The quantities may be measured on-line. On-line measurements herein refer to multiple measurements made in sequence such that the temporal difference between the measurements is reasonably small and that give the result of the measurement reasonably fast. Preferably the measurements are repeated such that the time difference between the measurements is at most four hours. Correspondingly, an embodiment comprises measuring the content of sodium sulphate ($Na_2SO_4$) at a second instance of time t2 (see FIG. 4a), wherein the second instance t2 of time is at most 4 hours earlier than the first instance of time t1. The time for the measurement herein refers to the point of time of sampling. When measurement is made on-line, sampling is automatic. In such a case, typically, a pipeline is configured to convey green liquor from the dissolving tank 200 to the first sensor arrangement 320. Preferably, the second instance of time t2 is at most 1 hour, at most 30 minutes, or at most 10 minutes earlier than the first instance of time t1.

Having the control of the flow of weak white liquor into the dissolving tank 200 made relatively soon after the measurements (as indicated above) has the beneficial effect that the properties of the green liquor do not change a lot in between the measurements and the control. If the time difference t1–t2 was larger, there would be, at the first instance of time, more uncertainty of the true values of the measured quantities.

In an embodiment of the system, the first sensor arrangement is configured to measure the content of sodium sulphate ($Na_2SO_4$) on-line.

On-line measurements have the further advantage, that the temporal difference $\Delta t$ between the sampling and the time of determining the value is reasonably small. In particular, concerning the reduction, it is known that some of the sodium sulphide $Na_2S$ of the green liquor may oxidize to sodium thiosulphate ($Na_2S_2O_3$), if the temporal difference $\Delta t$ between sampling and the rest of the measurement is large. Moreover, if even larger temporal difference $\Delta t$ is used, some of the sodium thiosulphate ($Na_2S_2O_3$) may further oxidize to sodium sulphate $Na_2SO_4$. In this way, only provided that the temporal difference $\Delta t$ is sufficiently small, the measured concentrations reflect accurately the in-situ properties of the green liquor. Conversely, provided that the temporal difference $\Delta t$ is large, the measured concentrations reflect only the properties of the oxidized green liquor. As indicated above, the time difference t1–t2 is relatively small. Also, since the measured value is needed in the control, the time difference $\Delta t$ is less than t1–t2 (see FIG. 4). This ensures that the formation sodium sulphate via sodium thiosulphate is small during the time $\Delta t$. In addition, the content of sodium sulphite can be determined from the same sample, or another sample, in such a way that the content of $Na_2S$ is determined at most the time $\Delta t$ after sampling. What has been said about the magnitude of $\Delta t$ applies also for measuring $c(Na_2S)$.

As known e.g. from FI114813, the total sodium correlates with the density of the green liquor. In this way, one can determine a maximum value of density of the green liquor on the condition that the solubility limit of pirssonite is not exceeded. As indicated in FIGS. 3a and 3b, such a maximum value would be dependent on temperature and $c(Na_2CO_3)$. Moreover, by measuring, in addition to the aforementioned quantities, the density p of the green liquor, one can control the flow rate of weak white liquor based on density. Furthermore, the density can be easily measured with a high sampling rate. Fast methods for measuring the density of green liquor can include e.g. methods based on the refractive index of the green liquor and methods based on absorption of the green liquor, e.g. absorption of radioactive radiation.

As an example, the document FI1114813 mentions that the density p may be approximated using the TTA by the equation $$\alpha_1 \rho = TTA + \alpha_0,$$

wherein $\rho$ is the density of the green liquor, TTA is defined above, and $\alpha_1$ and $\alpha_0$ are regression parameters. In particular, in that document, $\alpha_1$ is considered constant.

However, as indicated in FIG. 3a, the solubility of pirssonite is a function of $c(Na_2CO_3)$, total sodium, and temperature. As indicated above, in the alternative, the solubility of pirssonite may be seen as a function of $c(Na_2CO_3)$, $c(Na_2SO_4)$, TTA, and temperature. In this way, even if the density is correlated with TTA, in terms of solubility, the density should be correlated with total sodium. Correspondingly, the total sodium can be approximate by the equation $$\beta_1 \rho = \text{total sodium} + \beta_0,$$

wherein $\beta_0$ and $\beta_1$ are regression parameters. By this equation, a limit for density can be calculated from the aforementioned target value $\Xi-\Delta$; or an estimate for the total sodium can be calculated from the measured density, and the previously calculated target value $\Xi-\Delta$ can be used to control the flow rate of weak white liquor. The values for the regression parameters $\beta_0$ and $\beta_1$ can be found by fitting the measured data to the measured density.

Typically the density measurement of green liquor is simpler and faster than the measurements of the concentrations of the compounds of green liquor. In this way, based on measurements on the temperature and the concentrations, a target value for the density can be determined. Moreover, by measuring the density of the green liquor, the flow rate of weak white liquor can be controlled.

Correlation between total sodium and the density, however, is not accurate also because of sediments of the green liquor, and because a density meter may become dirty, whereby the measurement results of the density meter may drift in time.

Thus, in an embodiment, at least one of the content of sodium sulphate ($Na_2SO_4$) of the green liquor, the content of sodium hydroxide (NaOH) of the green liquor, the content of sodium sulphide ($Na_2S$) of the green liquor, and the content of sodium carbonate ($Na_2CO_3$) of the green liquor is measured at a third or the second instance of time (t3 or t2, see FIG. 4a). The embodiment comprises controlling the flow rate of the weak white liquor into the dissolving tank by using the measured density of green liquor.

Furthermore, the embodiment comprises measuring the density of the green liquor on-line at a fourth instance of time t4 (see FIG. 4a), after the second t2 or the third t3 instance of time and before the first instance of time t1.

An embodiment, wherein the process is controlled such that pirssonite is not formed, comprises controlling the flow rate of the weak white liquor into the dissolving tank by using the measured density of the green liquor and the target value for the density of green liquor. The embodiment further comprises determining a target value for the density of green liquor using the measured temperature, the measured content of sodium carbonate ($Na_2CO_3$), the measured content of sodium sulphate ($Na_2SO_4$), the measured content of sodium hydroxide (NaOH), and the measured content of sodium sulphide ($Na_2S$).

It is also noted that in this embodiment, the target value for the density of green liquor is not necessarily constant, but may be adapted based on the measurement results of the concentration(s) of the compound(s) of the green liquor. In this way, compared to a method, wherein a constant target value for the density would be used, in the embodiment, the concentration more accurately correlates with the total sodium. Therefore, a smaller a safety margin for a density can be used. This allows for increasing the TTA (and concentration) without a risk of forming solid pirssonite.

As indicated above, it is also possible to utilize the measured density the other way around. That is, because the density correlates with the quantity indicative of at least an amount of a pirssonite ($Na_2Ca(CO_3)_2 \cdot 2H_2O$) forming component in the green liquor, such as total sodium or TTA, the measured density may be used to determine the value of the quantity indicative of at least an amount of a pirssonite ($Na_2Ca(CO_3)_2 \cdot 2H_2O$) forming component in the green liquor.

In a corresponding embodiment of the system 050, the first sensor arrangement 320 is configured to measure the density of the green liquor on-line. Moreover, the processing unit arrangement CPU1, CPU2 is configured to determine, using the measured temperature, the content of sodium sulphate ($Na_2SO_4$), the content of sodium hydroxide (NaOH), the content of sodium sulphide ($Na_2S$), and the content of sodium carbonate ($Na_2CO_3$) a target value for the density of green liquor.

Figure 4B:
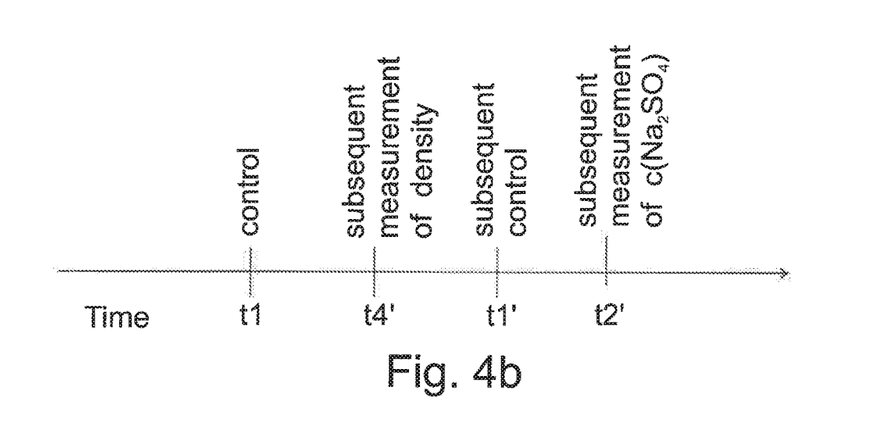
FIG. 4b shows the temporal order in which some subsequent measurements are made after the control.

For example, the measurement rate (i.e. delay time in between two subsequent measurements, e.g. $t2'-t2$ in FIG. 4) of the concentrations, such as TTA (i.e. the corresponding concentrations) and/or sodium sulphate may be from 10 min to 4 hour, or more typically from 10 min to 45 min. However, the measurement rate of the density of the green liquor may be much less, e.g. less than 5 min or less than 1 min, such as from 0.1 s to 5 min, such as from 0.5 s to 1 min. In this way there is a reasonable time window, in which the density based control is more accurate than the control based directly on the concentrations. Referring to FIG. 4b, after controlling the process, the density may be measured at a subsequent fourth instance of time $t4'$; and the process may be controlled at a subsequent first instance of time $t1'$ based on the later density measurements. Such a control is more accurate than control based on density measurements made at the second or third instance of time $t2$. As is evident, the concentrations related to total sulphur and temperature are repeated at a subsequent second instance of time $t2'$. Concentration can be used for controlling the flow rate of weak white liquor in all embodiment, not only, when avoiding the formation of pirssonite in the way indicated above.

On-line measurement of the concentration of sodium sulphate is particularly feasible, since that is the main compound of green liquor that makes the total sodium and TTA different. In other words, the concentration of sodium sulphate is the main component affecting the density of green liquor, but not affecting TTA. Therefore, sodium sulphate is the main reason, why the density of green liquor does not perfectly correlate with the TTA thereof. It has been noticed that the correlation between density and TTA is reasonably inaccurate in particular, when reduction is low (i.e. the green liquor comprises a lot of sodium sulphate). Conversely, by having a high reduction, the density correlates typically well with TTA. One reason to have a reasonably large safety margin $\Delta$, at least when density is utilized in the control, is that the correlation between density and TTA is not accurate. Thus, by controlling the process in such a way that reduction is maximized—also in presence of process disturbances, whereby the reduction stays high also in such cases—also the safety margin $\Delta$ can be decreased. This helps to optimize the TTA of the green liquor.

By measuring the aforementioned concentrations, the value of the reduction can be calculated (see above).

As indicated above, it is also beneficial that the smelt flows continuously from the recovery boiler 100 to the dissolving tank 200. Continuous flow refers to a flow that is greater than zero (e.g. kg of smelt per second) at all times. A continuous flow can be expected, provided that the temperature of the char bed 150 exceeds the melting point of the material of the char bed 150, optionally the temperature exceeds the melting point by another safety margin $\Delta_2$. Correspondingly, an embodiment of the method comprises determining a melting temperature for the char bed 150 of the recovery boiler 100, measuring the temperature of the char bed 150, and controlling at least a process parameter of the recovery boiler in such a way that the flow of smelt is continuous. For example, the process parameter of the recovery boiler can be controlled such that the temperature of the char bed exceeds the melting point of the material of the char bed, optionally by the other safety margin $\Delta_2$. For example, by decreasing the size of the black liquor droplets, the temperature can typically be increased. However, when the droplets are too small, they tend to flow with the combustion air to an upper section of the furnace 105. Thus, by adjusting the droplet size and the air flow, the temperature can be controlled. The control depends also on the content of black liquor, which depends on the type of cellulosic material used in the digester. Thus, the control may need to be done on case-by-case basis. For example, by varying the parameters and measuring the changes in the process, one may determine the direction to which the parameters should be adjusted to obtain proper TTA and reduction; and optionally also the flow rate of smelt, Qs (see FIG. 2), in addition to the other quantities of the process.

When the flow of smelt is continuous, the tendency of the process control to oscillate around the target value will decrease. Thus, by controlling also the process parameters of the recovery boiler in such a way that the flow of smelt is continuous, the safety margin $\Delta$ can be further decreased. Moreover, if the flow of smelt was not continuous, occasionally large amounts of smelt would enter the dissolving tank at a time. Since the smelt is hot, a large amount thereof would vaporize the weak white liquor, which could result in explosion. Thus, also the continuous flow of smelt is important from the point of view of safety and reliability. Smelt that does not flow is known as jellyroll smelt. Reasons for jellyroll smelt formation include an exceptionally high melting temperature of the char bed.

As for the process parameters of the recovery boiler 100, the same process parameters can be controlled, as recited above. As for measuring the temperature of the char bed 150, the system 050 may comprise a temperature sensor 410 configured to measure the temperature of the char bed. The temperature sensor 410 may be an optical temperature sensor. The optical temperature sensor 410 may be a camera, such as an infrared camera, or a pyrometer.

As for determining a melting temperature for the char bed 150 of the recovery boiler 100, the melting temperature (i.e. melting point) depends on the content of the char bed 150. In particular, the melting temperature depends on the contents of e.g. $Na_2CO_3$, $Na_2S$, $Na_2SO_4$, NaOH, NaCl, $K_2CO_3$, $K_2S$, $K_2SO_4$, KOH and KCl; of which four first can be determined from the measured contents of the green liquor. In principle, all the contents could be solved by analysing the composition of the black liquor. However, this is oftentimes time consuming and expensive. It has been found that by analysing Cl and K content of the ash of the recovery boiler 100, suitably accurate estimates for the contents of compounds comprising chlorine (e.g. NaCl) and potassium in isolation of chlorine (e.g. $K_2CO_3$, $K_2S$, $K_2SO_4$), and potassium in combination with chlorine (KCl) can be made.

A reasonably accurate estimate for the melting temperature can be made by using $c(Na_2CO_3)$, $c(Na_2S)$, $c(NaOH)$, and $c(Na_2SO_4)$ as measured from the green liquor (see above); and the content of Cl and K as measured from the ash of the recovery boiler 100. In addition, for the calculation one may determine at least some, preferably all, of the flow rate of black liquor into the recovery boiler (e.g. in units of $m^3/h$),
the flow rate of green liquor (e.g. in units of $m^3/h$), as indicated by Qout in FIG. 2,
the flow rate of weak white liquor (e.g. in units of $m^3/h$), as indicated by Qin in FIG. 2
the density of green liquor,
the density of weak white liquor, and
the concentrations $c(Na_2CO_3)$, $c(Na_2S)$, $c(NaOH)$, and $c(Na_2SO_4)$ of the weak white liquor.

In case the flow rates are measured in units of mass per time, the densities need not to be measured. However, more typically the flow rates are measured in units of volume per time, and also the densities are measured. It is also noted, that in the dissolving tank some of the liquor evaporates.

A corresponding embodiment thus comprises
measuring the content of chlorine (Cl) and potassium (K) from the ash produced by the recovery boiler 100, and
determining the melting temperature of the char bed 150 of the recovery boiler 100 by using
the content of chlorine and potassium, as measured from the ash and
the contents $c(Na_2CO_3)$, $c(Na_2S)$, $c(NaOH)$, and $c(Na_2SO_4)$, as measured from the green liquor.

It has also been found that the solubility of the pirssonite can be affected by an additive. The solubility data shown in FIGS. 3a and 3b refer to a situation without such an additive. However, by providing such an additive, e.g. by adding the additive to the weak white liquor, the solubility curves of FIGS. 3a and 3b can be pushed to right and upwards; i.e. the solubility limit can be increased.

A corresponding method comprises adding some additive to the green liquor or to the weak white liquor, wherein the additive is configured the decrease the tendency of the green liquor of forming solid pirssonite ($Na_2Ca(CO_3)_2 \cdot 2H_2O$). An example of such an additive is Fennodispo™ as it stands on Sep. 15, 2016.

The process control as indicated above is a reactive control. I.e. the method reacts to the measured quantities and controls the flow of weak white liquor correspondingly. However, to improve the control, it is also possible to apply a proactive control. In the proactive control, the value of flow rate of smelt, Qs in FIG. 2, e.g. in unit of kg/s from the recovery boiler 100 to the dissolving tank 200 is determined. Moreover, the flow rate Qin of the weak white liquor into the dissolving tank 200 is controlled by using also the determined value for the flow rate of the smelt.

For example, the recovery boiler may comprise smelt spouts 160 configured to convey smelt from the recovery boiler 100 to the dissolving tank 200. The smelt spouts 160 may be cooled. The smelt spouts 160 may be cooled using a water circulation 162. Also other heat transfer medium could be used to cool the smelt spout 162. By calculating the change of the cooling power of the smelt spouts, the change of flow rate of smelt Qs can be determined. For example, when an increase or a decrease in the flow rate of smelt is measured, the flow rate Qin of weak white liquor can be increased or decreased correspondingly. In particular, the target value for the quantity indicative of at least an amount of a component of pirssonite ($Na_2Ca(CO_3)_2 \cdot 2H_2O$) can be increased or decreased accordingly. As indicated above, the target value for the quantity indicative of at least an amount of a component of pirssonite ($Na_2Ca(CO_3)_2 \cdot 2H_2O$) may be e.g. one of the density p of the green liquor, the content of total titratable alkali (TTA) of the green liquor, and the total content of compounds comprising sodium. The flow rate Qin of the weak white liquor into the dissolving tank 200 can be controlled by using the target value and a value of that quantity that corresponds to the target value. For the purpose, the system 050 may comprise a temperature sensor 164 configured to determine the temperature of the smelt entering the dissolving tank. As shown in FIG. 2, the sensor 410 is configured to determine the temperature of the smelt entering the smelt spout 160. The system 050 may further comprise a flow sensor configure to determine the flow or flow rate of the cooling medium flowing in the cooling circulation 162. Furthermore the system 050 may comprise a temperature sensor arrangement configure to determine the temperature difference between the cooling medium at in inlet and at an outlet of the cooling circulation 162.

In particular the proactive control decreases the tendency of the process control to oscillate around the target value. Thus, by determining a value of the flow rate of the smelt from the recovery boiler into the dissolving tank, the safety margin Δ can be further decreased. Therefore, an embodiment of the method comprises measuring at least one of the density and the temperature of the weak white liquor, which enters the dissolving tank. The embodiment further comprises controlling the flow rate of the weak white liquor into the dissolving tank by using also the measured value(s) of the weak white liquor. Referring to FIG. 2, an embodiment of the system comprises a second sensor arrangement 330 configured to measure at least one of the density and the temperature of the weak white liquor. The second sensor arrangement 330 is configured to send a signal or signals indicative of the measured value(s) of the weak white liquor to the processing unit arrangement CPU1, CPU2. Moreover, in the embodiment, the processing unit arrangement CPU1, CPU2 is configured to control the flow rate of the weak white liquor into the dissolving tank by using the first regulator 310 and the signal(s) from the second sensor arrangement 330.

Figure 5:
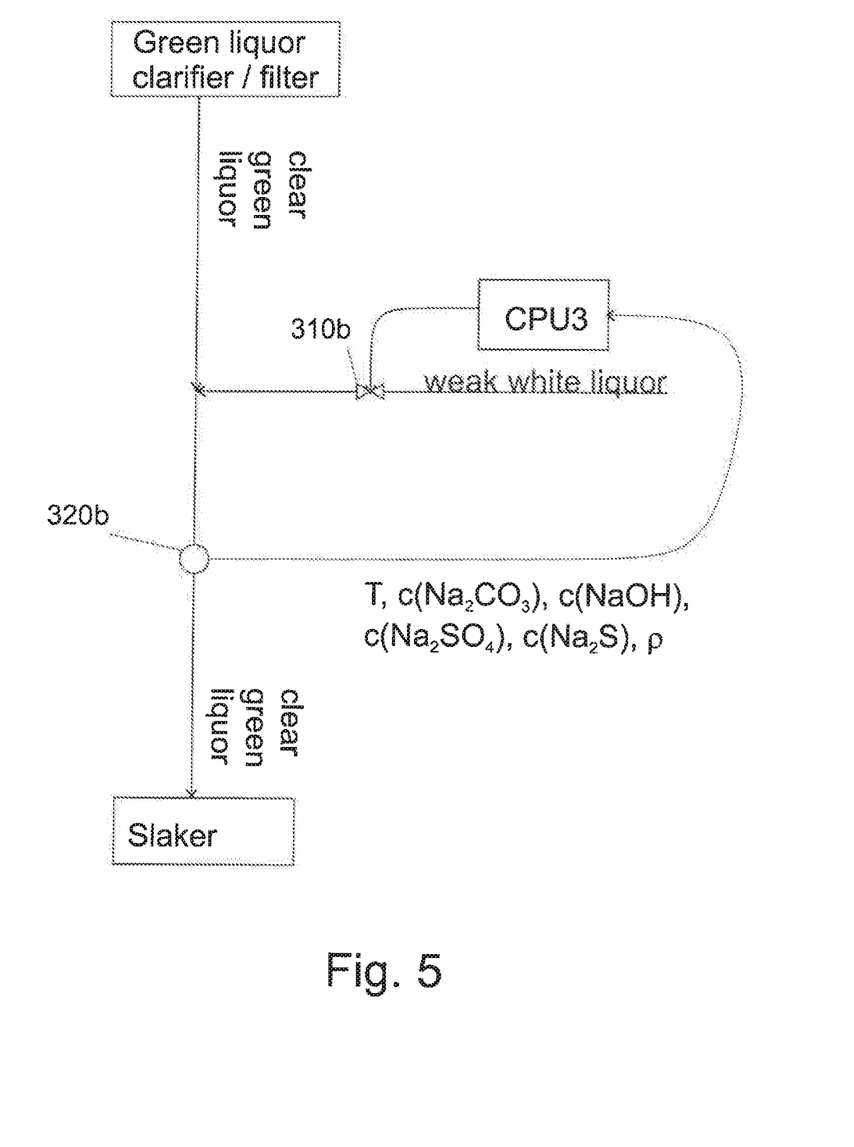
FIG. 5 shows a system configured to control flow of weak white liquor also to a slaker.

It is also possible to apply the same principles before the causticizer (see FIGS. 1 and 5), preferably in combination with the control of weak white liquor into the dissolving tank 200, as discussed above. As is evident, the same principles could be applied independently on how the control of weak white liquor into the dissolving tank 200 is done. For example, if the temperature of the green liquor decreases, the solubility of pirssonite will decrease (see FIGS. 3a and 3b). To prevent pirssonite from forming later in the process, some weak white liquor may be added also before the causticizer, e.g. after the slaker (see FIGS. 1 and 5). The flow rate of weak white liquor to the causticizer may be controlled with the regulator 310b of FIG. 5. Moreover, the aforementioned properties of the green liquor, after having been mixed with the weak white liquor, can be measured with the third sensor arrangement 320b of FIG. 5. The processing unit CPU3 of FIG. 5 may be arranged to perform the method and to control the regulator 310b. The processing unit CPU3 can be seen as a part of the processing unit arrangement (CPU1, CPU2, CPU3). In the alternative, the same processing unit CPU1 can control both the flow rates of the weak white liquor (into the dissolving tank, as in FIG. 4; and into the causticizer, as in FIG. 5).

The invention claimed is:

1. A method for optimizing a reduction and a content of total titratable alkali of a green liquor of a recovery boiler, the method comprising:
producing the green liquor by dissolving a smelt from the recovery boiler in a dissolving tank by conveying a weak white liquor into the dissolving tank,
measuring at least
a content of sodium sulphate ($Na_2SO_4$) of the green liquor,
a content of sodium hydroxide (NaOH) of the green liquor,
a content of sodium sulphide ($Na_2S$) of the green liquor, and
a content of sodium carbonate ($Na_2CO_3$) of the green liquor,
controlling at least one of a temperature and an oxygen content within the recovery boiler by using the measured content of sodium sulphate ($Na_2SO_4$) and the measured content of sodium sulphide ($Na_2S$) to maximize the reduction in the recovery boiler, and
at a first instance of time, controlling the flow of the weak white liquor into the dissolving tank by using the measured content of sodium sulphate ($Na_2SO_4$), the measured content of sodium hydroxide (NaOH), the measured content of sodium sulphide ($Na_2S$), and the measured content of sodium carbonate ($Na_2CO_3$) to optimize the content of total titratable alkali of the green liquor.

2. The method of claim 1, further comprising:
determining a melting temperature for a char bed of the recovery boiler,
measuring a temperature of the char bed, and
controlling the at least one of the temperature and the oxygen content within the recovery boiler in such a way that a flow of the smelt is continuous.

3. The method of claim 2, further comprising:
measuring at least the content of sodium sulphate ($Na_2SO_4$) of the weak white liquor, the content of sodium hydroxide (NaOH) of the weak white liquor, the content of sodium sulphide ($Na_2S$) of the weak white liquor, and the content of sodium carbonate ($Na_2CO_3$) of the weak white liquor,
determining the flow rate of a black liquor into a furnace of the recovery boiler,
determining the flow rate of the green liquor and the flow rate of the weak white liquor, and
measuring contents of chlorine (Cl) and potassium (K) from ash produced by the recovery boiler,
wherein the determining of the melting temperature for the char bed of the recovery boiler uses at least
the measured contents of chlorine and potassium, as measured from the ash,
the measured contents of sodium sulphate ($Na_2SO_4$), sodium hydroxide (NaOH), sodium sulphide ($Na_2S$), and sodium carbonate ($Na_2CO_3$) of the green liquor,
the measured contents of sodium sulphate ($Na_2SO_4$), sodium hydroxide (NaOH), sodium sulphide ($Na_2S$), and sodium carbonate ($Na_2CO_3$) of the weak white liquor,
the determined flow rate of the black liquor into the furnace of the recovery boiler, and
the determined flow rate of the green liquor and the flow rate of the weak white liquor.

4. The method of claim 3, further comprising determining, in units of mass per time: (i) the flow rate of the black liquor into the furnace, (ii) the flow rate of the green liquor, and (iii) the flow rate of the weak white liquor, by measuring: (a) the flow rate of the green liquor in units of volume per time, (b) the flow rate of the weak white liquor in units of volume per time, (c) the density of the green liquor, and (d) the density of the weak white liquor.

5. The method of claim 1, wherein the at least one of the temperature and the oxygen content within the recovery boiler is controlled by controlling at least one process parameter of the recovery boiler selected from the group consisting of:
a flow rate of combustion air into the recovery boiler,
a distribution of the combustion air in the recovery boiler,
a pressure of the combustion air,
a flow velocity of the combustion air,
a pressure of a concentrated black liquor, which is fed to a furnace of the recovery boiler,
a temperature of the concentrated black liquor,
a flow velocity of the concentrated black liquor, and
a size of an orifice of a nozzle used to feed a black liquor into the furnace.

6. The method of claim 1, further comprising:
measuring a temperature of the green liquor,
determining, using: (i) the measured temperature of the green liquor, (ii) the measured content of sodium carbonate ($Na_2CO_3$) of the green liquor, (iii) the measured content of sodium sulphate ($Na_2SO_4$) of the green liquor, (iv) the measured content of sodium hydroxide (NaOH) of the green liquor, and (v) the measured content of sodium sulphide ($Na_2S$) of the green liquor:
a maximum allowable value for a quantity indicative of at least an amount of a pirssonite ($Na_2Ca(CO_3)_2.2H_2O$) forming component in the green liquor on the condition that a solubility limit of pirssonite is not exceeded, and
a value of the quantity indicative of at least an amount of the pirssonite ($Na_2Ca(CO_3)_2.2H_2O$) forming component in the green liquor, and
controlling the flow of the weak white liquor into the dissolving tank by using:
the determined maximum allowable value for the quantity indicative of at least an amount of a pirssonite ($Na_2Ca(CO_3)_2.2H_2O$) forming component in the green liquor on the condition that the solubility limit of pirssonite is not exceeded, and
the determined value of the quantity indicative of at least an amount of the pirssonite ($Na_2Ca(CO_3)_2.2H_2O$) forming component in the green liquor, in such a way that
the content of total titratable alkali of the green liquor is maximized on the condition that solid pirssonite ($Na_2Ca(CO_3)_2.2H_2O$) is not formed in the green liquor.

7. The method of claim 6, further comprising:
determining, using at least the measured temperature of the green liquor, the measured content of sodium carbonate ($Na_2CO_3$) of the green liquor, and information on the solubility of pirssonite in the green liquor, a theoretical maximum value for the quantity indicative of at least an amount of a component of pirssonite on the condition that solid pirssonite ($Na_2Ca(CO_3)_2.2H_2O$) is not formed in the green liquor,
determining a safety margin for the quantity indicative of at least an amount of a component of pirssonite, and
controlling the flow of the weak white liquor into the dissolving tank by optimizing the value of the quantity indicative of at least an amount of a component of pirssonite towards a target value that is calculated by subtracting the determined safety margin from the determined theoretical maximum value.

8. The method of claim 1, wherein:
the content of sodium sulphate ($Na_2SO_4$) of the green liquor, is measured on-line at a second instance of time, and the second instance of time is at most 4 hours earlier than the first instance of time.

9. The method of claim 8, wherein the second instance of time is at most 1 hour earlier than the first instance of time.

10. The method of claim 1, further comprising:
measuring, at a second or third instance of time, at least one of:
the content of sodium sulphate ($Na_2SO_4$) of the green liquor,
the content of sodium hydroxide (NaOH) of the green liquor,
the content of sodium sulphide ($Na_2S$) of the green liquor, and
the content of sodium carbonate ($Na_2CO_3$) of the green liquor,
at a fourth instance of time, which is after the second or third instance of time and before the first instance of time, measuring a density of the green liquor on-line, and

[A]
determining a target value for the density of green liquor using the measured temperature, the measured content of sodium carbonate ($Na_2CO_3$), the measured content of sodium sulphate ($Na_2SO_4$), the measured content of sodium hydroxide (NaOH), and the measured content of sodium sulphide ($Na_2S$) of the green liquor, and
controlling the flow of the weak white liquor into the dissolving tank by using the measured density of the green liquor and the determined target value for the density of green liquor, or

[B]
determining a value of a quantity indicative of at least an amount of a pirssonite ($Na_2Ca(CO_3)_2 \cdot 2H_2O$) forming component in the green liquor using the measured density of the green liquor.

11. The method of claim 1, further comprising:
determining a value indicative of a change of flow rate of the smelt from the recovery boiler into the dissolving tank, and
controlling the flow of the weak white liquor into the dissolving tank by using the determined value indicative of a change of the flow rate of the smelt.

12. The method of claim 11, further comprising:
determining a target value for at least one feature selected from the group consisting of:
a density of the green liquor,
a content of total titratable alkali of the green liquor, and
a total content of compounds comprising sodium, and
controlling the flow of the weak white liquor into the dissolving tank by using the determined target value of the at least one feature, and a value of the density of the green liquor, the content of total titratable alkali of the green liquor, and a total content of compounds comprising sodium, respectively.

13. The method of claim 11, further comprising:
conveying the smelt from the recovery boiler to the dissolving tank through a smelt spout,
cooling the smelt spout with a circulation of a heat transfer medium, and
determining a change of a cooling power of the smelt spout to determine a value indicative of a change of flow rate of the smelt.

14. The method of claim 1, further comprising:
measuring at least one of:
a density of the weak white liquor, and
a temperature of the weak white liquor, and
controlling the flow of the weak white liquor into the dissolving tank by using the measured density and/or temperature of the weak white liquor.

15. The method of claim 1, wherein at least two contents selected from the group consisting of:
the content of sodium sulphate ($Na_2SO_4$) of the green liquor,
the content of sodium hydroxide (NaOH) of the green liquor,
the content of sodium sulphide ($Na_2S$) of the green liquor, and
the content of sodium carbonate ($Na_2CO_3$) of the green liquor, are measured by titration.

16. A system for producing a green liquor with optimized reduction and content of total titratable alkali, the system comprising:
a recovery boiler,
a dissolving tank comprising:
a first inlet for receiving a smelt from the recovery boiler,
a second inlet for receiving a weak white liquor, and
an outlet for the green liquor,
a first regulator configured to regulate a flow of the weak white liquor into the dissolving tank,
a second regulator configured to regulate at least one of a temperature and an oxygen content within the recovery boiler,
a first sensor arrangement configured to measure at least
a content of sodium sulphate ($Na_2SO_4$) of the green liquor,
a content of sodium hydroxide (NaOH) of the green liquor,
a content of sodium sulphide ($Na_2S$) of the green liquor, and
a content of sodium carbonate ($Na_2CO_3$) of the green liquor, the first sensor arrangement being further configured to give at least one signal indicative of the measured contents, and
a processing unit arrangement configured to:
control the at least one of the temperature and the oxygen content within the recovery boiler by using the second regulator and the at least one signal from the first sensor arrangement in such a way that a reduction of the green liquor is maximized, and
control the flow of the weak white liquor into the dissolving tank by using the first regulator and the at least one signal from the first sensor arrangement.

17. The system of claim 16, wherein the second regulator is configured to regulate the at least one of the temperature and the oxygen content within the recovery boiler by regulating at least one process parameter selected from the group consisting of:
a flow rate of combustion air into the recovery boiler,
a distribution of the combustion air in the recovery boiler,
a pressure of the combustion air,
a flow velocity of the combustion air,
a pressure of a concentrated black liquor, which is fed to a furnace of the recovery boiler,
a temperature of the concentrated black liquor,
a flow velocity of the concentrated black liquor, and a size of an orifice of a nozzle used to feed a black liquor into the recovery boiler.

18. The system of claim 16, wherein:

the first sensor arrangement is further configured to measure a temperature of the green liquor, and the processing unit arrangement is further configured to control the flow of the weak white liquor into the dissolving tank by using the measured temperature of the green liquor, in such a way that a content of total titratable alkali of the green liquor is maximized on the condition that solid pirssonite ($Na_2Ca(CO_3)_2 \cdot 2H_2O$) is not formed in the green liquor.

19. The system of claim 16, wherein:

the first sensor arrangement is further configured to measure the content of sodium sulphate ($Na_2SO_4$) on-line.

20. The system of claim 16, wherein:

the first sensor arrangement is further configured to measure a density of the green liquor on-line, and

[A] the processing unit arrangement is further configured to determine a target value for the density of the green liquor using: (i) the content of sodium sulphate ($Na_2SO_4$), (ii) the content of sodium hydroxide (NaOH), (iii) the content of sodium sulphide ($Na_2S$), and (iv) the content of sodium carbonate ($Na_2CO_3$), or

[B] the processing unit arrangement is further configured to determine, using the density of green liquor, a target value for a quantity indicative of at least an amount of a pirssonite ($Na_2Ca(CO_3)_2 \cdot 2H_2O$) forming component in the green liquor.

21. The system of claim 16, further comprising:

a second sensor arrangement configured to:

measure at least one of a density of the weak white liquor, and a temperature of the weak white liquor, and send at least one signal indicative of the measured density and/or temperature of the weak white liquor to the processing unit arrangement, wherein:

the processing unit arrangement is further configured to control the flow of the weak white liquor into the dissolving tank by using the first regulator and the at least one signal from the second sensor arrangement.

22. The system of claim 16, wherein:

the first sensor arrangement comprises a titrimeter configured to measure at least two contents selected from the group consisting of:

the content of sodium sulphate ($Na_2SO_4$) of the green liquor, the content of sodium hydroxide (NaOH) of the green liquor, the content of sodium sulphide ($Na_2S$) of the green liquor, and the content of sodium carbonate ($Na_2CO_3$) of the green liquor.

\* \* \* \* \*